W. T. MINOR.
YOKE.
APPLICATION FILED APR. 4, 1908.

915,202.

Patented Mar. 16, 1909.

Witnesses

Inventor
W. T. Minor.
By D. Swift
Attorneys

THE NORRIS PETERS CO., WASHINGTON, D. C.

UNITED STATES PATENT OFFICE.

WILLIAM T. MINOR, OF WHITEROCK, OKLAHOMA.

YOKE.

No. 915,202.  Specification of Letters Patent.  Patented March 16, 1909.

Application filed April 4, 1908. Serial No. 425,104.

*To all whom it may concern:*

Be it known that I, WILLIAM T. MINOR, a citizen of the United States, residing at Whiterock, in the county of Noble and State of Oklahoma, have invented a new and useful Yoke; and I do hereby declare the following to be a full, clear, and exact description of the invention, such as will enable others skilled in the art to which it appertains to make and use the same.

The invention relates to an improvement in yokes and has for its object to provide a simple, inexpensive and durable device of this character adapted to be applied to swine and other kinds of live stock and which will effectually prevent them from passing through holes in fences or other openings from which it is desired to exclude them.

With these and other objects in view the invention consists in the novel combination and arrangement of parts hereinafter described and shown and particularly pointed out in the appended claims.

Figure 1:
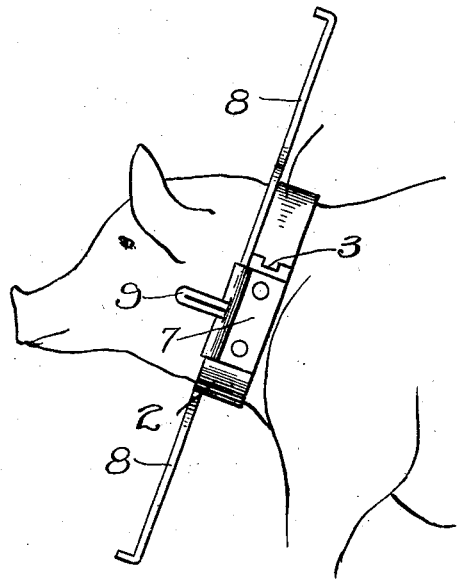
Figure 2:
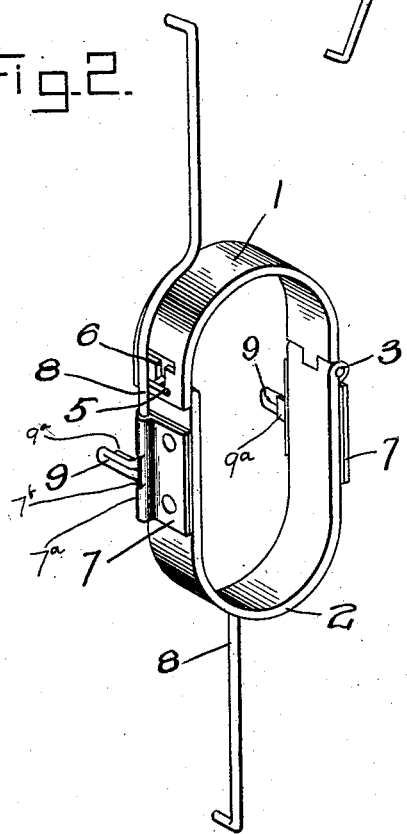
Figure 3:
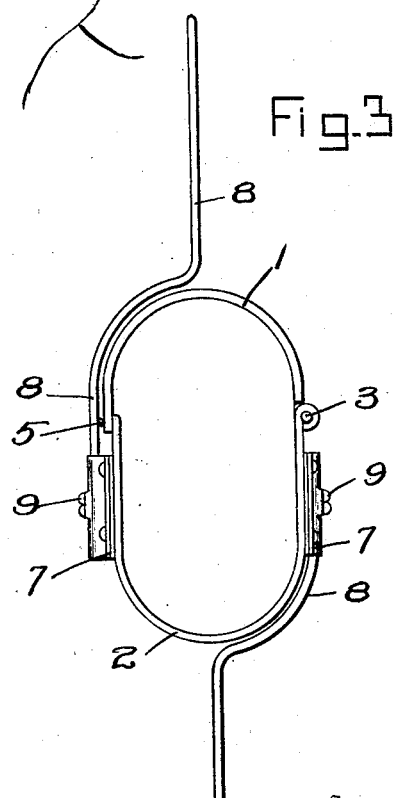

In the drawing Figure 1 is a side elevation of my invention showing it applied to the head of an animal. Fig. 2 is a perspective view of the same. Fig. 3 is a view taken at right angles to Fig. 1.

Referring to the drawings, 1 designates the upper portion of my yoke which is pivotally connected with the lower portion 2, as at 3. The lower portion is provided with a hook 5 which passes through a slot 6 in the upper portion of the yoke and by which the two parts are connected together. The device is provided with a pair of plates 7 which are bent in the shape of a loop and secured to the yoke. Each of these plates has mounted therein an arm 8 one of which extends upwardly and one downwardly. The arms 8 have a limited pivotal movement in said loop and are bent upon themselves, as shown in the drawings to provide inwardly projecting members 9 which are adapted to pierce the animal wearing it when he attempts to pass through any place from which it is desired to exclude him. The said loops 7ᵃ of the plates 7 are provided with openings 7ᵇ, through which the said projections 9 extend, as will be clearly seen in Figs. 1 and 2 of the drawings; to return the arms 8 to their normal positions, springs 9ᵃ are secured between the said plates 7 and the sides of the lower member 2, and are designed for the purpose of contacting with the said projections 9, as will be clearly evident from the drawings. With these projections the animal will be deterred from pressing hard against any point by reason of the pain which these projections will cause him.

As clearly illustrated in Fig. 3 of the drawings, the arms 8 have a curved portion where they adjoin the yoke, and by reason of this curve, it will be seen, when the animal wearing the yoke presses it forward against any object, the projections 9 will be moved inwardly thus choking and punishing the animal.

What is claimed is:—

1. A device as set forth, comprising neck-embracing members, pivoted together, one member having a slot and the other a hook to engage said slot, plates bent upon themselves to form elongated loops, secured to opposite sides of the device, arms mounted in said loops, one extending upwardly and one downwardly, said loops having openings, said arms or members being bent upon themselves to form projections extending through said openings, springs carried by one member which engage the projections to return the arms to their normal positions, as and for the purpose specified.

2. A device as set forth, comprising upper and lower hinged members having slot and hook connections for fastening their free ends, plates bent upon themselves to form elongated loops secured to the lower member, said loops having openings therein, arms mounted in said loops, each composed of a single length of metal bent upon itself to form a horizontal projection, said projections being designed to extend through said openings, and springs mounted on said device and adapted to engage said projections for throwing the same outwardly.

In testimony whereof I have signed my name to this specification in the presence of two subscribing witnesses.

WILLIAM T. MINOR.

Witnesses:
 GEO. M. DIGNEY,
 FRANK WRIGHT.